H. N. MOODY.
DEMOUNTABLE RIM.
APPLICATION FILED FEB. 9, 1922.
1,426,090.
Patented Aug. 15, 1922.
2 SHEETS—SHEET 2.
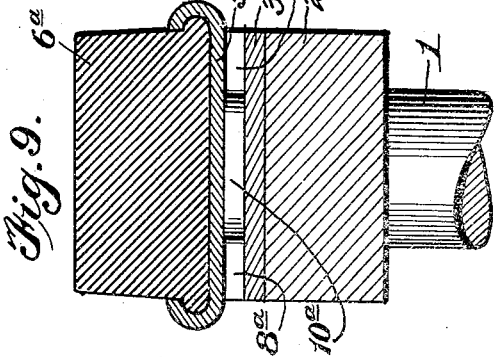
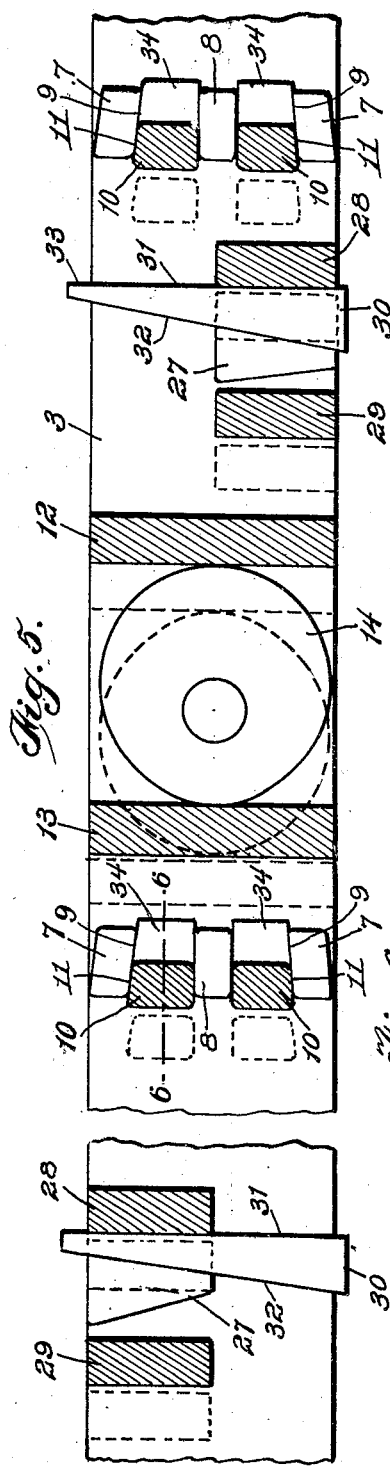
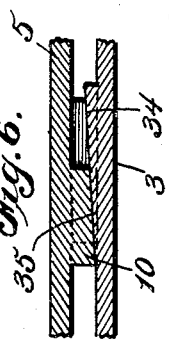
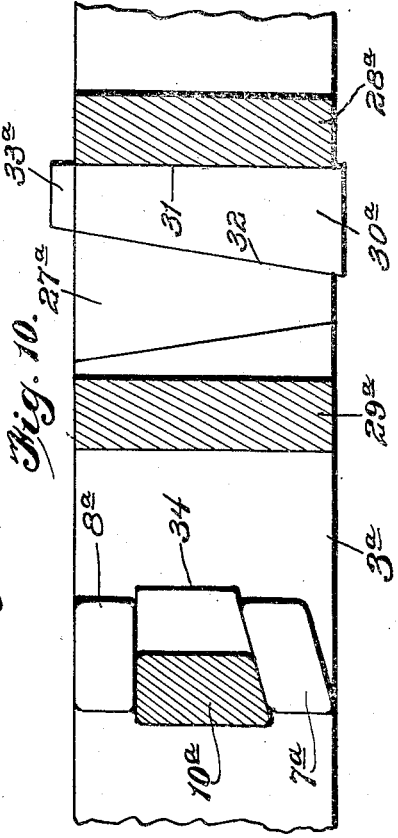
Inventor:
Howard N. Moody,
By C. C. Hines,
Attorney.

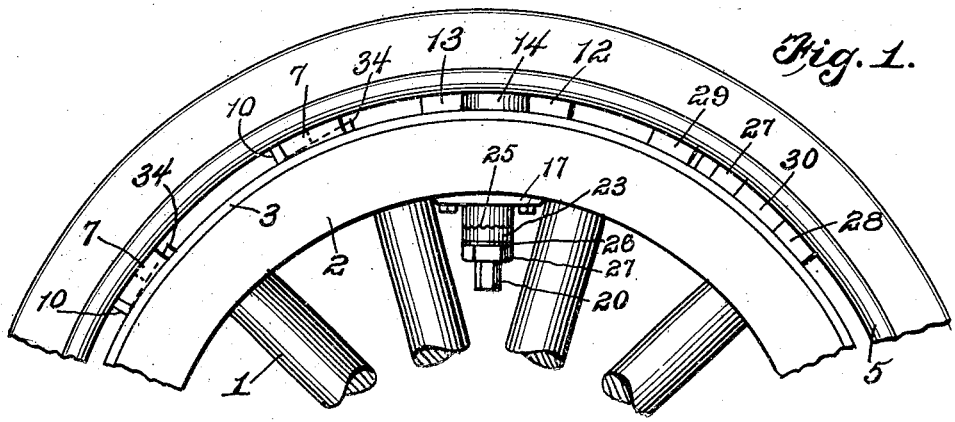
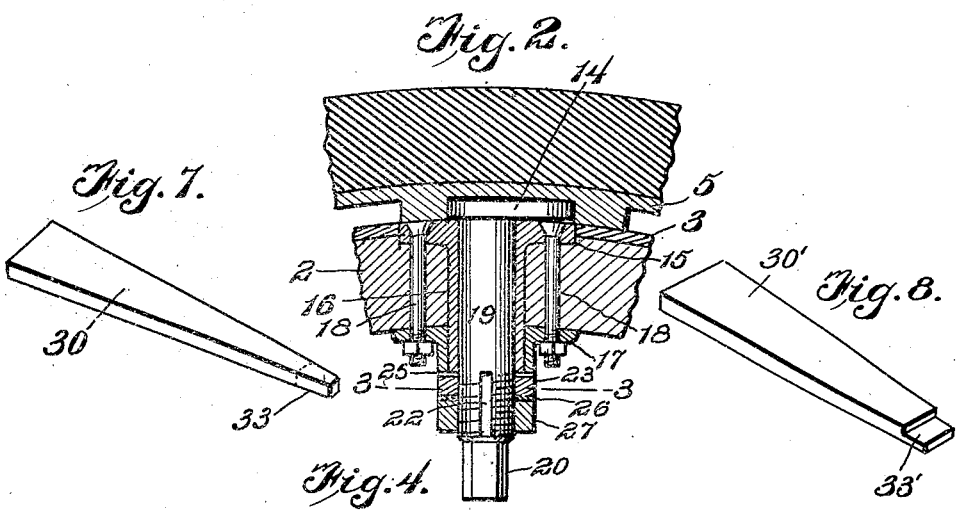
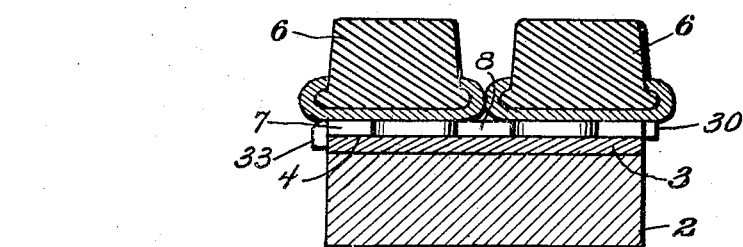
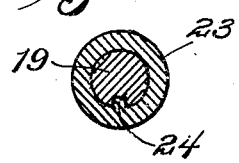

UNITED STATES PATENT OFFICE.

HOWARD NADIN MOODY, OF NEW ORLEANS, LOUISIANA.

DEMOUNTABLE RIM.

1,426,090. Specification of Letters Patent. Patented Aug. 15, 1922.

Application filed February 9, 1922. Serial No. 535,296.

*To all whom it may concern:*

Be it known that I, HOWARD N. MOODY, a citizen of the United States, residing at New Orleans, in the parish of Orleans and State of Louisiana, have invented new and useful Improvements in Demountable Rims, of which the following is a specification.

This invention relates to demountable tire-carrying rims for vehicle wheels, and particularly to means for applying the tire-carrying rim to and removing it from the wheel-rim and for locking said tire-carrying rim in service position upon the wheel-rim. More particularly the present invention relates to rims designed for holding solid elastic tires, although the salient and essential features of the invention may be employed upon rims designed for holding pneumatic or cushioned tires.

The object of the invention is to provide simple, reliable and efficient means for the purposes described, said means being of a type for securing certain important and desirable advantages, as hereinafter fully set forth.

In the accompanying drawings,—

Figure 1 is a fragmentary side elevation of a wheel showing the application of the invention thereto.

Figure 2 is a detail longitudinal section through the rim members, showing the cam applying and releasing device and the locking means therefor. Figure 3 is a detail section on line 3—3 of Figure 2.

Figure 4 is a vertical transverse section through the wheel-rim and the demountable rim applied thereto.

Figure 5 is a diagrammatic plan view of a portion of the wheel-rim, showing the binding and locking and releasing elements upon the rim members, the demountable rim being omitted and parts thereon appearing in section in locking position and in dotted lines in released position.

Figure 6 is a detail section on line 6—6 of Figure 5.

Figures 7 and 8 are views of locking and releasing wedges.

Figure 9 is a view similar to Figure 4, showing a modified construction for carrying a single solid tire.

Figure 10 is a view similar to Figure 5 of parts applying to the construction shown in Figure 9.

Referring to the drawings, and particularly to Figures 1 to 8, inclusive, 1 designates the spokes, 2 the felly and 3 the outer metallic retaining band or fixed rim of the wheel of an automobile or other similar vehicle. As shown, the rim 3 extends around and across the felly 2 and is provided with an outer abutment or seat face 4, which is continuous between its lateral edges and devoid of side retaining flanges. A tire-carrying rim 5 is adapted to be demountably applied to the fixed rim 3 and as shown in the present instance is constructed to receive a pair of solid tires 6 arranged side by side on opposite sides of the medial line thereof. The rim 5 and tire 6 applied thereto provide a structure designed for use upon motor trucks, and for other heavy duty use, but the rim 5 may be constructed to receive any desired type of tire.

Arranged at proper intervals upon the opposed faces of the rims 3 and 5 are interengaging elements for holding the rim 5 demountably secured to the rim 3. As shown, the face 4 of the rim 3 is provided at spaced intervals with a transverse row of binding lugs, comprising two outer lugs 7 and a central or intermediate lug 8. The lugs 7 are arranged on opposite sides of the longitudinal center of the rim, and the lug 8 at a point coinciding with the center of the rim and equidistantly between the lugs 7. The lugs 7 are arranged at reverse angles, on lines converging in the direction of locking movement of the rim 3, or otherwise so arranged as to have their inner faces provide inclined or wedge surfaces 9, while the lug 8 is shown as having its sides parallel with each other and with the axis of the rim.

The rim 5 is provided with a set of binding lugs to cooperate with each set of binding lugs 7 and 8 on the rim 3, the binding lugs 10 on the rim 5, two in number, being properly spaced to enter into the spaces between the central lug 8 and inclined inner sides of the side lugs 7, and said lugs 10 are provided with straight inner side edges to bind frictionally against the straight sides of the lug 8 and with inclined outer side edges 11 to bind frictionally against the inclined side edges 9 of the lugs 7. The rim 5 is adapted to be moved laterally on and off the rim 3 via the outer side thereof, the dotted line indications in Figure 3 of the lugs 10 showing the position of said lugs when the rim member 5 is disposed upon the rim member 3 with the sets of lugs out of locking engagement, so that said rim 5 is free for application or removal. It will thus be understood that when the rim 5 is applied with the lugs 10 in the dotted line positions, a rotary movement of said rim 5 to the right in Figure 5 will cause the lugs 10 to pass into the spaces between the lugs 7 and 8 and to come into binding or wedging engagement with said lugs 7 and 8, thus fastening the rim 5 on the rim 3 against any possibility of lateral displacement, while a reverse rotary motion of the rim 5, or to the left in Figure 5, will move the lugs 10 back to their dotted line positions, thus adapting the rim 5 to be withdrawn from the wheel.

Suitable means are provided for shifting the rim 5 circumferentially on the rim 3 into and out of locking position and for locking said rim 5 to the rim 3, in applied position, against circumferential movement. I have shown in the drawings two sets of devices which may be employed for the purpose, and which may be separately or conjointly used. One of these sets of devices comprises transverse abutment ribs 12 and 13 on the rim member 5 for cooperation with a shifting and locking cam or eccentric 14 on the rim member 3. This cam or eccentric 14 is adapted to be rotated to two extreme positions, within an arc of 180°, to shift the rim 5 to locked or released positions. When the cam 14 is rotated to the full line position shown in Figure 5, it engages the rib 12 and moves the rim 5 circumferentially on the rim 3 to draw the lugs 10 into engagement with the lugs 7 and 8, while on the other hand when the cam 14 is rotated to the dotted line position shown in Figure 5 it engages the rib 13 and shifts the rim 3 backwardly so as to move the lugs 10 out of engagement with the lugs 7 and 8, thus releasing the rim 5 for detachment from the rim 3. The cam 14 is in the form of a disk movable in contact with a wear plate 15 carried by a bushing 16 extending through the felly 2 and through a retaining sleeve 17, said wear plate, bushing and sleeve being secured to the felly by fastening bolts 18. Journaled in the bushing is a rock shaft or stem 19 carried by the cam, which stem is provided with an angular inner end 20 to which a wrench or similar tool may be applied for turning the same to actuate the cam 14 for the described purposes. The shaft 19 is threaded to receive a binding nut 21 and is grooved, as at 22, to receive a locking ring 23 disposed between said nut and the ends of the bushing and sleeve, said ring being provided with a fixed spline or key 24 which engages the groove 22 to hold the ring against rotary movement while permitting it to move, when freed, longitudinally toward and from the sleeve and bushing. The opposed faces of the bushing, sleeve and locking ring are toothed or serrated, as at 25, so that when the ring is held against the same, upon the turning up of the nut 21, the shaft 19 will be locked against rotation, thus preventing any movement of the cam 14, whereby said cam may be employed to lock the rim 5 in applied position. When the nut 21 is loosened, however, the toothed surface of the locking ring may be moved out of engagement with the toothed surfaces of the bushing and sleeve, thus allowing the shaft 19 to be turned for cam actuating motions. A washer 26 of suitable type, such as a split spring washer, may be disposed between the locking ring and nut to hold the latter, when screwed up, against loosening or casual disengagement.

The other set of devices employed for imparting circumferential motion to the rim member 3 and for locking the same in applied position and releasing it for removal are in the form of wedge elements arranged in sets any suitable distance apart around the circumference of the wheel. Each set of wedge elements comprises a wedge-shaped lug 27 arranged transversely at one side of the center of the rim 3 for cooperation with a pair of spaced lugs or ribs 28 and 29 on the rim 5. The lugs or ribs 28 and 29 have straight transverse faces, while the lug 27 has its transverse faces inclined and converging in one direction. A wedge key 30, adapted to be extended longitudinally between and across the rim members 3 and 5, is provided with a straight longitudinal edge 31 and an inclined longitudinal edge 32, and this wedge key is adapted to be driven between the lug 27 and either of the lugs 28 and 29 for the purpose of shifting the rim member 5 circumferentially in one direction or the other on the rim member 3. Figure 5 shows in dotted lines the positions which the lugs 28 and 29 occupy when the rim 5 is in released position and in full lines the position which said lugs occupy when the rim 5 is in applied position. It will be readily understood that when the key 30 is inserted and driven across the rim between the lugs 27 and 28, the wedge action set up will move the rim 5 to applying position, drawing the lugs 10 into wedging engagement with the lugs 7 and 8, while when the key 30 is inserted and driven into position between the lugs 27 and 29 the wedging action instituted will move the rim 5 circumferentially in the reverse direction on the rim 3, thus shifting the lugs 10 out of wedging engagement with the lugs 7 and 8, leaving the rim 5 free to be removed.

The key 30 is of greater length than the width of the rim 3 and is preferably made of some bendable metal, so that when said key is applied its end portion 33 may be bent at an angle against the adjacent edge of the rim, forming a stop to hold the key from withdrawal, the keys of the wedging devices thus serving to lock the rim 5 in applied position on the rim. When it is desired to unlock the rim 5 and release it, this may be effected by simply straightening the ends 33 of the wedge keys and driving said keys out of position and afterwards inserting and driving them between the cooperating pairs of lugs 27 and 29 to move the rim 5 backwards circumferentially on the rim 3. In Figure 8 I have shown a slightly modified form of key 30' having an end portion 33' which is reduced to allow it to be readily bent for the purpose described.

In Figure 5 I have shown two sets of wedge elements 27, 28 and 29 and coacting wedge keys 30, which are arranged on opposite sides of the longitudinal center of the rim 3. This arrangement may be employed to allow wedge keys to be used from either side of the wheel, or to render a wheel interchangeable for right or left hand use, in which event the right and left hand sets of wedge lugs may be alternately disposed around the wheel; but if desired the sets of wedge lugs may be arranged on one side or the other of the circumferential center of the rim 3 of any wheel accordingly as it is intended for right or left hand use. According to circumstances, I may employ the actuating and locking cam and actuating and locking wedges separately or conjointly on the wheel, employing them separately when desired on a light wheel allowing ready and easy manipulation of the rim 5, or conjointly upon a heavy wheel in which their combined action may be found to be of advantage when the rim 5 binds or is rusted on the rim 3 and is difficult to remove. Where the devices are used conjointly the wedge keys and cooperating parts will always be found of advantage in enabling the rim 5 to be loosened up and the cam member of advantage in effecting or assisting in effecting the circumferential motion and locking the demountable rim to the fixed rim in an easy and convenient manner.

In order to secure a firm binding action of the rim 5 on the rim 3, and to properly center said rim 5 with relation to said rim 3, I may provide additional binding elements, consisting of wedge surfaces 34 on the rim member 3 between the lugs 7 and 8 for coaction with inclined or wedge surfaces 35 on the lugs 10, said wedge surfaces frictionally engaging and properly centering the rim 5 in the applying action and moving out of engagement when the rim 5 is released, as will be readily understood.

In the form of my invention shown in Figures 9 and 10, illustrating its application to a type of wheel employing a demountable rim with a single solid tire, intended more particularly for lighter weight vehicles, the same general features of construction may be employed with slight variations. As shown in this instance, the demountable rim $5^a$ is formed to receive a single solid tire $6^a$, and said rim $5^a$ and the fixed rim $3^a$ are provided at suitable intervals with sets of wedge binding lugs and wedge actuating and fastening members, one set of each of which is shown. In this construction the rim $3^a$ is provided with a pair of lugs $7^a$ and $8^a$, the lug $7^a$ being inclined and the lug $8^a$ straight, said lugs being adapted to receive between them a single binding lug $10^a$ on the rim $5^a$, the wedge surfaces 34 and 35 being also employed. In this construction also the wedge lug $27^a$ is provided extending completely across the rim $3^a$ for cooperation with spaced lugs $28^a$ and $29^a$ on the rim member $5^a$ and a wedge key $30^a$ having a bendable end portion $33^a$, the construction otherwise being the same as illustrated specifically in Figure 5. The operation of this construction shown in Figures 9 and 10 will be readily understood. While not specifically illustrated, the cam actuating and locking device may be employed on this modified form of rim either separately or in conjunction with the wedge actuating and locking means, or said wedge actuating and locking means may be employed without the cam device.

The advantages of my construction are that it provides a demountable rim which may be easily seated upon the fixed rim for applying movement, and easily removed therefrom when in released position, and that it is adapted to be readily and conveniently rotated into and out of service position and locked securely in such position, so that when applied it can not possibly become displaced, while its removal may be easily and conveniently effected. Its features of construction for holding, locking and releasing the demountable rim render it particularly desirable for use on motor truck wheels, motor delivery vehicle wheels, and other heavy duty vehicle wheels, where strength and security of mounting, with ease of application and removal, are important factors.

Having thus fully described my invention, I claim:—

1. In a demountable rim, the combination of a fixed rim member, a demountable rim member movable laterally on and off the fixed rim member and also circumferentially on said fixed rim member, coacting binding elements on said rim members, engageable and disengageable on reverse relative circumferential movements of said rim members, whereby the demountable rim member is adapted to be held from or released for lateral motion on the fixed rim member, a wedge lug on one rim member, a pair of spaced abutment lugs on the other rim member arranged to come on opposite sides of said wedge lug, and a removable bendable-metal wedge key of greater length than the width of the rim members adapted to be driven transversely from one side of the wheel across the faces of said rim members between either side of said wedge lug and one or the other of said abutment lugs, said key having an end projecting at the other side of the wheel and adapted to be bent to form a stop for holding it from displacement.

2. In a demountable rim, a fixed rim member, a demountable rim member movable laterally on and off the fixed rim member and also circumferentially thereon, binding elements on the rim members engageable and disengageable on reverse circumferential movements of the rim members for holding the demountable rim member from or releasing it for lateral motion on the fixed rim member, a rotary eccentric on one of the rim members engageable with the other rim member for shifting said demountable rim member circumferentially in either direction, a wedge lug on one of the rim members, spaced lugs on the other rim member adapted to come on opposite sides of said wedge lug, and a wedge key adapted to be driven between either side of the wedge lug and one or the other of said spaced lugs for shifting the demountable rim circumferentially in either direction and locking it in applied position against circumferential movement.

3. In a demountable rim, the combination of a fixed rim member, a demountable rim member movable laterally on and off the fixed rim member and also circumferentially on said fixed rim member, coacting binding elements on said rim members, engageable and disengageable on reverse relative circumferential movements of said rim members, whereby the demountable rim member is adapted to be held from or released for lateral motion on the fixed rim member, a wedge lug on one rim member, a pair of spaced abutment lugs on the other rim member arranged to come on opposite sides of said wedge lug, and a wedge key adapted to be driven transversely across the faces of said rim members between either side of said wedge lug and one or the other of said abutment lugs, said key having a portion displaced from its normal plane and directly engaging one of said rim members for holding said key against casual withdrawal.

4. In a demountable rim, a fixed rim member, a demountable rim member movable laterally on and off the fixed rim member and also circumferentially on said fixed rim member, binding elements on the fixed rim member consisting of at least two transversely spaced radial lugs having outer peripheral faces curved on arcs concentric with the inner face of the inner rim member so as to have surface contact therewith devoid of wedging engagement, and said fixed rim member being provided with a wedge surface between said lugs inclined in a circumferential direction to its periphery, a binding lug on the demountable rim adapted to enter between said spaced radial lugs and of a width conforming to the distance between the opposed lateral faces thereof, said binding lug being free from contact with the peripheral faces of said spaced lugs and having an inclined surface for wedging engagement only with the wedge surface on the fixed rim, and means for shifting the demountable rim circumferentially on the fixed rim and locking it in applied position thereon.

5. In a demountable rim, a fixed rim member, a demountable rim member movable laterally on and off the fixed rim member and also circumferentially thereon, means on said rim members engageable and disengageable through reverse circumferential movements of the demountable rim member, for holding said demountable rim member from or releasing it for lateral motion on the fixed rim member, a wedge lug on one of the rim members having opposite inclined faces, a pair of lugs on the other rim member adapted to come on opposite sides of said wedge lug, and a wedge key adapted to be disposed between either inclined side of the wedge lug and the adjacent cooperating lug for shifting the demountable rim circumferentially on the fixed rim member.

6. In a demountable rim, a fixed rim member of substantially uniform thickness in transverse section and having a transversely flat seat face devoid of side flanges, said seat face being provided with spaced series of transversely alined radial binding lugs, each consisting of three lugs, to wit, two outer lugs arranged on opposite sides of the center of said seat face and an intermediate lug arranged centrally of said seat face, the intermediate lug having straight side faces parallel with the circumferential center of the rim and the outer lugs having inclined faces converging in one direction toward the circumferential center of the rim, a demountable rim member movable laterally on and off the fixed rim member and also circumferentially on said fixed rim member, a series of binding elements on the demountable rim member for engagement with the series of binding elements on the fixed rim member, each consisting of a pair of transversely alined wedge lugs movable into the spaces between the intermediate lug and outer lugs of the coacting series of binding lugs on the fixed rim member, said wedge lugs being free from contact with the peripheral faces of the binding lugs and having inner straight lateral faces for engagement with the straight faces of the central lug of the fixed rim and inclined outer faces for engagement with the inclined inner faces of the outer lugs of the fixed rim, and means for shifting the demountable rim circumferentially on the fixed rim and locking it thereto.

7. In a demountable rim, a fixed rim member, a demountable rim member movable laterally on and off the fixed rim member and also circumferentially thereon, binding elements on the rim members engageable and disengageable on reverse circumferential movements of the rim members for holding the demountable rim member from or releasing it for lateral motion on the fixed rim member, a rotary eccentric on one of the rim members engageable with the other rim member for shifting said demountable rim member circumferentially in either direction, a wedge lug on one of the rim members having opposite inclined faces, spaced lugs on the other rim member adapted to come on opposite sides of said wedge lug, and a wedge key adapted to be driven between either inclined side of the wedge lug and one or the other of said spaced lugs for shifting the demountable rim circumferentially in either direction and locking it in applied position against circumferential movement.

8. In a demountable rim, a fixed rim member, a demountable rim member movable laterally on and off the fixed rim member and also circumferentially thereon, binding elements on one rim member comprising at least a pair of transversely alined and spaced lugs, a binding lug on the other rim member movable between and into and out of engagement with said lugs, said lugs having wedging engagement when in binding position, a wedge lug on one of the rim members having opposite inclined faces, a pair of spaced lugs on the other rim member adapted to come on opposite sides of said wedge lug, and a wedge key adapted to be driven between either one of the spaced lugs and an inclined side of the wedge lug.

9. In a demountable rim, a fixed rim member, a demountable rim member movable laterally on and off the fixed rim member and also circumferentially thereon, two series of wedge lugs on the fixed rim member, arranged on opposite sides of the center of said rim member, the lugs of each series alternating in arrangement around the wheel, each wedge lug being of substantially V-form and having opposite inclined faces, means for shifting the demountable rim member circumferentially of the fixed rim member, two series of sets of abutment lugs arranged correspondingly to said wedge lugs on the demountable rim member, each set comprising a pair of abutment lugs having opposed inner straight transverse faces adapted to come on opposite sides of a correspondingly arranged coacting wedge lug on the fixed rim member, and a wedge driving and locking adapted to be driven transversely of and between the faces of the rims between either inclined face of a wedge lug and the contiguous straight face of one or the other of the abutment lugs at the opposite sides of said wedge lug.

In testimony whereof I affix my signature.

HOWARD NADIN MOODY.